United States Patent Office 3,288,591
Patented Nov. 29, 1966

3,288,591
METALLURGY
Joseph K. Stone, Berkeley, Calif., assignor to Kaiser Industries Corporation, Oakland, Calif., a corporation of Nevada
No Drawing. Filed July 24, 1963, Ser. No. 297,230
4 Claims. (Cl. 75—52)

This invention relates to the production of steel, and particularly to the production of steel directly from iron ore or other natural or prepared compounds of iron.

In present methods for the production of steel, it is first necessary to recover impure iron from its ore and then to purify the iron to form steel. Generally, a blast furnace is employed to reduce iron from iron ore. The blast furnace produces a material called pig iron, which is an impure form of iron containing approximately 4% of carbon and lesser amounts of other impurities. The pig iron produced in a blast furnace must then be converted to steel by such means as an open-hearth furnace, a basic oxygen converter or other known processes for producing steel from pig iron and other sources of ferrous metal. Conversion of pig iron to steel usually is effected by oxidation of impurities such as carbon, silicon, phosphorous and sulfur followed by removal of the resultant oxides either as gases or by dissolving in slag.

In accordance with this invention, iron ore may be charged directly to a basic oxygen steel producing process and converted to steel without an intervening reduction step. For purposes of this invention the term *iron ore* is defined as any iron oxide that must be reduced before it can be utilized as a steel product, and it includes but is not limited to ordinary iron ores and such materials as mill scale, scarfing scale and flue dust, etc., which are formed in iron producing and fabricating processes.

The process of this invention is a modified basic oxygen conversion process. The conventional basic oxygen conversion process is one in which steel is produced by charging an open-topped, refractory-lined converter with ferrous material, usually hot metal and scrap, and with slag-forming materials. Usually the charge contains some iron oxide in the form of mill scale but only a small amount is employed to provide quick slagging and some temperature control. Conversion is effected by blowing substantially pure oxygen downwardly onto the charge whereby oxidation of impurities and excess carbon is effected. *Hot metal* is the term used to describe molten iron, which is usually melted pig iron that contains substantial quantities of carbon and impurities. The converter is also charged with slag-forming ingredients which may include fluorspar, bauxite, lime, limestone and others that form a molten phase that floats on the iron and combines with nonmetallic impurities, such as silicon dioxide, phosphorous pentoxide, and sulfur that form during the conversion process. By combining with the slag phase, these impurities are removed from the molten steel product.

In the process of this invention the basic oxygen conversion process is modified to adapt it for reducing iron ore as well as converting the resultant iron to steel by a process which includes balancing the temperature, heat input, carbon content and other process variables to provide in the converter conditions in the proper sequence to produce the desired results.

In the process of the present invention a quantity of molten iron preferably at a temperature of about 2400° F. or higher is added to a converter or retained in the converter from a previous heat as a matrix or iron body into which ore may be fed and reduced to iron. The iron body intermittently or continuously is carbonized and heated to raise its carbon content and temperature. The carbon content should be high enough to provide carbon to reduce subsequently added iron ore and some excess over the amount ultimately desired. Usually about at least 2% by weight carbon is necessary in the matrix. The temperature should be high enough to provide reaction heat for the subsequent reduction of ore. Usually a temperature of at least 2500° F. is required. In this description and the appended claims, the term *carbonizing* means increasing the carbon content of iron by adding suitable carbonaceous material, such as coke, charcoal, oil, methane, etc., to the molten iron. For example, carbon may be added to the molten iron body by introducing oil beneath its surface or by blowing natural gas downwardly onto it at high velocity through a tube or lance. Oxygen blowing may be carried on concurrently with carbonization and with the addition of flux materials so that there is produced in the converter a high carbon molten iron body at high temperature upon which a molten slag is floating. Excess slag is preferably removed at this point of the process because the slag is hot and well liquified, the calcium oxide to silicon dioxide ratio is in the desirable range of 2.0–2.5 to 1 and the carbon content of the metal is high (approximately 3.0+%), all of which tend to keep the loss of iron to the slag low, in the range of 10% FeO in the slag or less.

In accordance with this invention, iron ore is added to the hot, highly carbonized ferrous body in the converter. In the highly carbonaceous and high temperature molten ferrous body, the iron ore is reduced very quickly to iron which melts to form a homogeneous body while the carbon content of the total ferrous material is diminished, and the oxidized impurities which are in the ore are dissolved in the slag phase. It is particularly advantageous to provide more carbon in the molten ferrous body than the amount necessary to reduce the ore because some oxygen blowing, which reduces the carbon content, is desirable to oxidize impurities after all the ore is introduced. After the ore is introduced, oxygen is introduced through the lance, and oxygen blowing is continued until the carbon content of the homogeneous molten ferrous phase is at the desired level, at which time most nonmetallic impurities will be oxidized and combined with or dissolved in the slag phase. At this point, the steel product is low in carbon and of high purity, the whole converter is at high temperature and the slag phase contains considerable ferrous material. The steel product is recovered except for that amount required for use as the iron body or matrix for the next batch, and the iron bearing slag is preferably retained for use in the next batch. The converter is then charged with the necessary additional slag-forming ingredients and carbonization of the retained iron body is begun to repeat the process cycle. The cycle may be repeated many times to produce efficiently and rapidly large quantities of high-grade steel directly from iron ore. The slag rejected from the converter should contain only a minimum amount of Fe, say 6%, and a high percentage of unwanted and oxidized impurities such as $SiO_2$, $P_2O_5$, MnO and $Al_2O_3$ from the pig iron and from the iron ore.

As an example of a process embodying this invention which is presented to illustrate the process but not to limit it, a tiltable, open-mouthed, refractory-lined converter is charged with 30 tons of scrap, 80 tons of hot metal, 7 tons of lime and 1 ton of mill scale. The conversion of this charge to steel is effected by blowing substantially pure oxygen downwardly onto the charge at a rate of 7,000 cubic feet per minute through a nozzle at the end of a water-cooled lance. The oxygen blowing period results in the oxidation of silicon, phosphorous, manganese, sulfur and carbon to produce a molten steel product with the desired carbon content and a slag phase containing the oxidized nonmetallic materials. Up to this point the basic oxygen conversion process is the conventional process.

The steel product that is produced is discharged from the converter except for approximately 50 tons of the molten product which is retained as an iron body or matrix. The 15–20 tons of slag which contains nearly 20% Fe retained in the vessel. The residual metal that remains is carbonized by introducing oil or coke breeze beneath the surface through a graphite conduit concurrently with the introduction of a small amount of oxygen through the lance, and oxidation and carbonization is continued until the matrix is at a temperature of approximately 2700° F. and contains about 2.0% carbon by weight.

When the above-noted temperature and carbon content are obtained, the oxygen blowing is stopped, slag in excess of that required for the next stage is removed, and 5 tons of iron ore having an iron content of approximately 60% are introduced into the molten matrix. The high temperature bath containing excess carbon quickly reacts with the iron ore reducing it to iron, and the remaining slag phase dissolves the nonmetallic impurities from the ore. After five minutes lime and other slag-forming ingredients are added to the converter and oxygen is again introduced through the lance at a rate of approximately 7,000 cubic feet per minute to bring the melt to the final carbon content and to effect final oxidation of the oxidizable impurities contained in the ore. After the final carbon content of the product is reached, the steel is removed from the converter except for the amount which is necessary to form a matrix for the next cycle.

The foregoing example is illustrative only of the process of this invention and it may be varied substantially within the scope of the invention. Particularly, the process may be varied by making additions of hot metal, scrap, partially reduced iron pellets, slag-forming materials, etc., in various conditions and at various temperatures in order to adjust the temperature of the process to that desired. For example, in processes where too much heat is evolved, large additions of cold scrap metal or other ferrous material may be employed both to increase the yield from the process and to reduce the temperature by the consumption of sensible heat and heat of fusion. It is also contemplated to make final adjustment of the composition of the steel product by oxygen blowing, carbonization, or adding alloying elements before the product is recovered. It is also contemplated to add various components to the converter simultaneously as by adding powdered coke, slag-forming ingredients or ore to the oxygen stream in the lance, or concurrently blowing oxygen and carbonizing gas into the converter.

What is claimed is:
1. A thermally balanced, cyclic, repetitive process for producing steel from iron ore, each cycle of the process including the sequence of steps comprising:
 (a) maintaining a molten iron body and a slag layer in a converter suitable for effecting the oxygen steel conversion process,
 (b) carbonizing the molten iron body in the converter to contain more carbon than that required to reduce subsequently added iron ore,
 (c) removing excess slag from the surface of the molten iron body,
 (d) heating the iron body by oxidation of dissolved carbon until the molten iron body is at a temperature of at least 2500° F.,
 (e) adding ore to the molten iron body,
 (f) adding fresh slag-forming material to the converter,
 (g) blowing substantially pure oxygen downwardly onto the surface of the molten iron body until the carbon content is reduced to the desired content of carbon whereby steel is produced,
 (h) recovering part of the resultant steel as product,
 (i) retaining in the converter another part of the resultant steel as said molten iron body for the next cycle, and
 (j) retaining slag within the converter for use in the next cycle.

2. The process of claim 1 wherein carbonizing is effected by introducing carbonaceous material beneath the surface of said molten iron body.

3. The process of claim 1 wherein carbonizing is effected by introducing carbonaceous material as a high velocity stream downwardly onto the surface of said molten iron body.

4. The process of claim 1 wherein substantially pure oxygen is blown downwardly onto said molten iron body while carbonization is being effected.

References Cited by the Examiner
UNITED STATES PATENTS

| | | | |
|---|---|---|---|
| 693,062 | 2/1902 | Potter | 75—40 |
| 1,551,465 | 8/1925 | Bruninghaus | 75—40 |
| 2,740,710 | 3/1956 | Johannsen | 75—40 |
| 2,756,137 | 7/1956 | Kocks | 75—56 |
| 2,895,820 | 7/1959 | Harders | 75—48 |

FOREIGN PATENTS

| | | |
|---|---|---|
| 724,780 | 2/1955 | Great Britain. |
| 820,351 | 9/1959 | Great Britain. |

BENJAMIN HENKIN, *Primary Examiner.*